United States Patent [19]

Lucarini

[11] 4,163,338

[45] Aug. 7, 1979

[54] ARTIFICIAL FISHING LURE

[75] Inventor: Francois Lucarini, Contes, France

[73] Assignee: Vibrax/MCA, Inc., Watertown, Mass.

[21] Appl. No.: 900,873

[22] Filed: Apr. 28, 1978

Related U.S. Application Data

[63] Continuation of Ser. No. 727,895, Sep. 29, 1976, abandoned.

[30] Foreign Application Priority Data

Dec. 18, 1975 [FR] France .................................. 75 11141

[51] Int. Cl.² ............................................ A01K 85/01
[52] U.S. Cl. ................... 43/42.17; 43/42.19; 43/42.31
[58] Field of Search ................. 43/42.31, 42.17, 42.12, 43/42.19, 17.1

[56] References Cited

U.S. PATENT DOCUMENTS

| 2,518,031 | 8/1950 | Lane | 43/42.31 |
| 2,833,078 | 5/1958 | Peltz | 43/42.31 |
| 3,226,875 | 1/1966 | Woolums | 43/42.31 |
| 3,908,298 | 9/1975 | Strader | 43/42.31 |
| 3,987,576 | 10/1976 | Strader | 43/42.31 |

FOREIGN PATENT DOCUMENTS

| 211600 | 10/1960 | Austria | 43/42.17 |
| 1029847 | 3/1953 | France | 43/42.19 |
| 784644 | 10/1957 | United Kingdom | 43/42.19 |

Primary Examiner—Nicholas P. Godici
Attorney, Agent, or Firm—Thomas C. Stover, Jr.

[57] ABSTRACT

An artificial fishing lure having a spoon rotatably mounted on a wire, a housing mounted on the wire aft of the spoon and a grooved sinker weight mounted on the wire within the housing is provided such that movement of the lure through the water causes the spoon to spin for increased visibility and the weight to contact the inside walls of the housing to generate sound signals. The lure of the invention is thus visible and audible. In one embodiment of the invention a fish hook is attached to the housing. In another embodiment, the housing is a bell shaped resonator open at the aft portion and the fish hook is attached to the wire just aft of the sinker weight and resonator.

27 Claims, 4 Drawing Figures

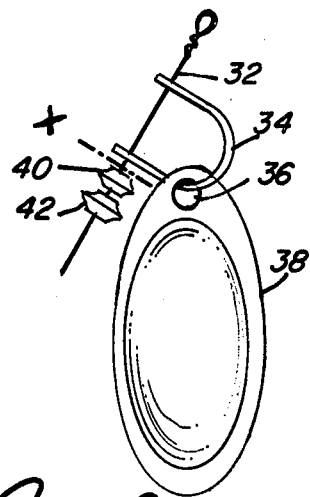
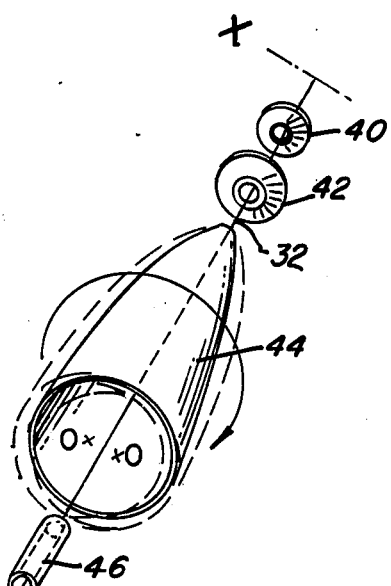
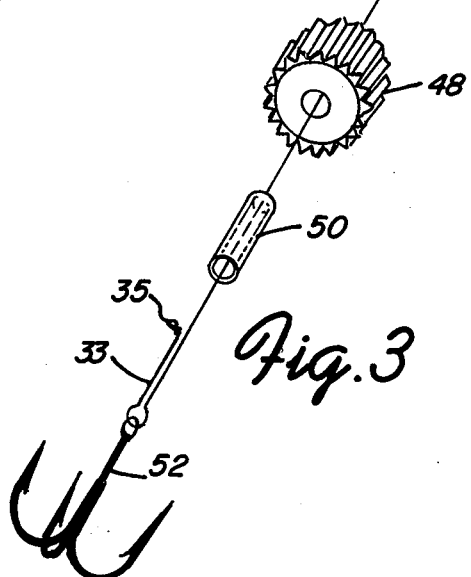
Fig.2
Fig.3
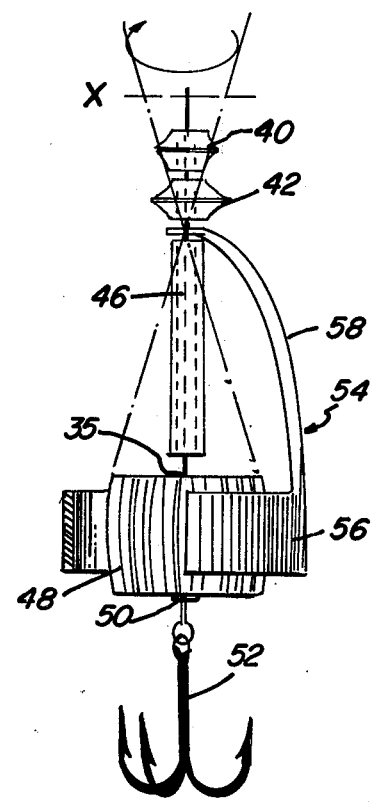
Fig.4

ARTIFICIAL FISHING LURE

This is a Continuation of application Ser. No. 727,895, filed Sept. 29, 1976 now abandoned.

FIELD OF THE INVENTION

This invention relates to an artificial fishing lure that moves relative to the water, particularly a fishing lure that is readily visible and emits sound waves.

THE PRIOR ART

Although artificial fishing lures, eg. for use in trolling and casting, in appropriate fishing waters are in widespread use, these lures seek to attract the attention of the fish visually, eg. by interplay of motion and light reflectance. Some lures have fin vanes of brightly polished metal, called spoons, due to their slightly hollowed shape, the spoon being attached to an axis such as a spindle, eg. a wire, the spoon rotating about the wire as the lure is pulled through the water. More specifically, the spoon has a small hole at one end thereof through which it attaches to a small stirrup which is mounted on the spindle, eg. (stainless steel wire). The aft portion of the stirrup bears on one or more thrust bushings (to reduce friction), which in turn bear on the trailing weight or sinker component of the lure after which is attached one or more fish hooks. However, the fish appear indifferent at times to the visual stimulation of this lure and refuse to go after it. Moreover, by the very nature of their environment, fish can not see very far. Their hearing is remarkably developed, however, since their sense organs may extend from head to tail in the form of points or lines arranged regularly along a median line.

What is needed therefore, is a fishing lure which not only provides visual stimulation, but also, one which emits sound waves to attract fish who might otherwise not see or be indifferent to the fishing lure that is merely visible for a relatively short distance. There is therefore a need and market for a fishing lure which is both visible and audible with a suitable sound to attract fish which overcomes the shortcomings of the above prior art artificial fishing lures.

SUMMARY

There has now been developed a fishing lure which, in addition to being noticeably visible, also emits vibratory waves including sound waves which attract fish.

I. Spoon Type Audible Fishing Lure With Hook Attached To Housing

Broadly, the present invention provides an artificial fishing lure comprising, an elongated spindle, a vane rotatably mounted thereon, a housing axially mounted on said spindle, the spindle passing with clearance into said housing, a weight suspended from said spindle within said housing such that relative motion of said lure through the water imparts rotational movement to the vane, which causes the attached weight to move into contact with the inside walls of said housing.

BRIEF DESCRIPTION OF THE DRAWINGS

The invention will become more apparent from the following detailed specification and drawings in which:

FIG. 2 is an elevation view of a portion of the fishing lure embodying the present invention;

FIG. 3 is an isometric projection of another portion of the fishing lure embodying the present invention continuing from transverse dashed line "X" in FIG. 2 and FIG. 4 is a partial sectional elevation of the assembled components of the fishing lure shown in FIG. 3, again taken from dashed line "X" of FIG. 2.

DETAILED DESCRIPTION

Figure 1:
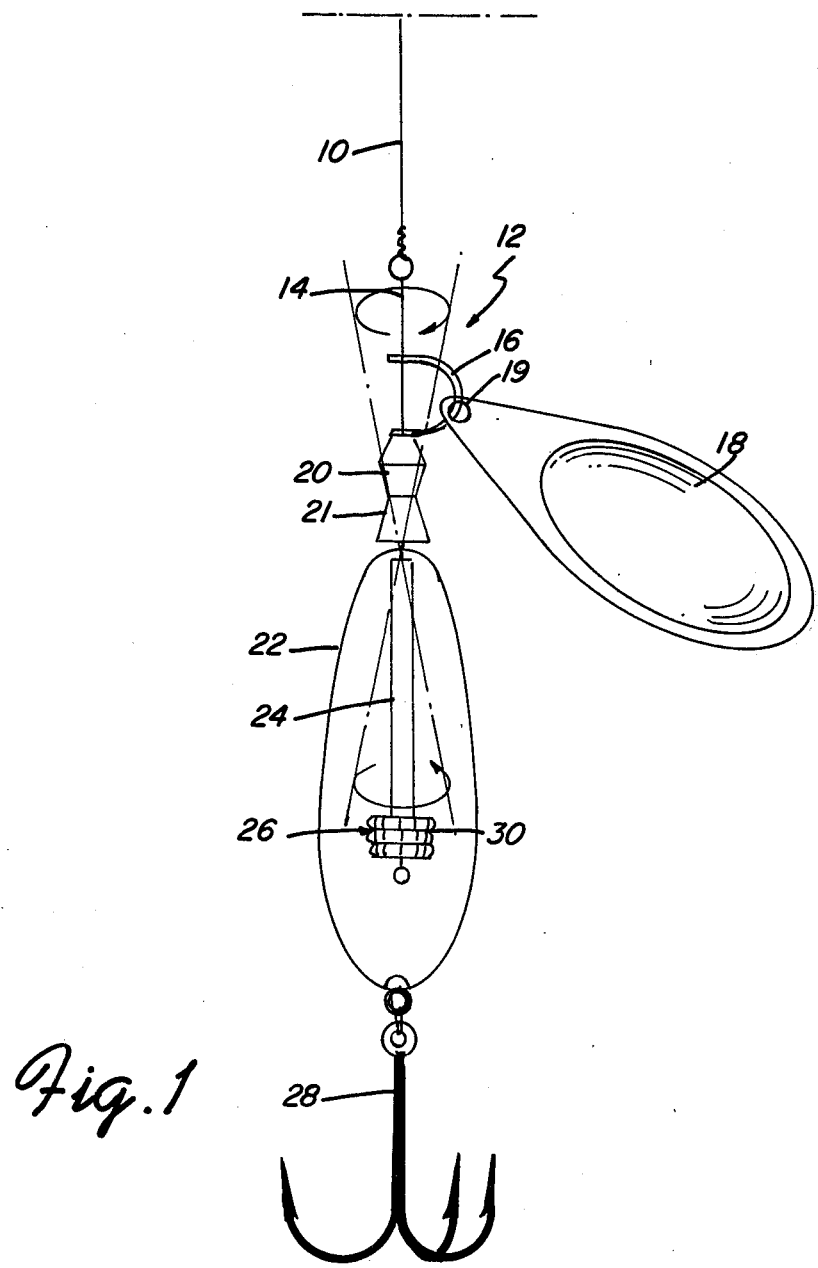
FIG. 1 is a sectional elevation view of the spoon type, audible, artificial fishing lure of the invention.

Referring to the drawings, as shown in FIG. 1, attached to the fishing line 10 is the audible fishing lure embodying the invention having connected thereto spindle (stainless steel wire) 14, which passes through stirrup 16, through a pair of bushings 20 and 21, through a small opening in the upper or leading portion of oval-hollow housing 22, through long bushing spacer 24 to the weights or sinker 26 mounted at the end of the spindle. Attached to the stirrup 16 through its aperture 19, is the vane or spoon 18, as shown in FIG. 1. Attached to the lower or aft portion of the housing 22, are fish hooks 28. The weights or weight 26 has vertical notches 30 cut therein, as also shown in FIG. 1. The notched weight 26 has an annular portion which is mounted on the spindle with a certain amount of play which permits axial rotation of said weight about the spindle.

In operation, as the lure embodying the invention is moved relative to the water, eg. in casting or in trolling, the spoon and stirrup are caused to rotate around the spindle. The bushings 20 and 21 serve to reduce the friction of rotation of the spoon 18 and the stirrup 16, which stirrup bears thereon and these bushings bear in turn on the upper and leading portion of the oval-housing through which the spindle passes freely. Since the spindle passes through the forward portion of the housing with some clearance, the housing hardly rotates while the weight 26 is subjected to some annular movement relative to the housing 22, as discussed below and contacts the inside housing walls causing vibrations and emission of signal waves which attract fish.

Accordingly, as indicated by the dotted lines and arrows in FIG. 1, upon movement of the lure through the water and rotation of the spoon 18, the spindle 14 describes a cone of revolution with its apex coincident with that of the oval housing upper portion, while the sinker weight attached to the spindle describes, within the housing, an inverted counterrotating cone of revolution, also, with its apex coincident with the upper portion of the oval housing with all the known geometric consequences. Tests show that the signal waves produced in the water by this spoon-type audible lure attract fish in an incomparable manner.

From the above disclosure, it can be seen that the audible fishing lure of the invention serves to attract the attention of the fish both visibly and audibly.

The rotating vane or trolling spoon embodying the invention desirably has a shiny surface, eg. guilded metal or solid metal that can be of substantially eliptical form and slightly hollow if desired.

The stirrup and spindle are desirably of metal, eg. stainless steel wire. The stirrup is preferably mounted with clearance to rotate on the spindle, eg. the spindle wire passes through eyes at the stirrup ends.

The thrust bushings can be of plastic, metal or other suitable material as desired and preferably are of metal.

The hollow oval-housing can be of metal, plastic, non-porous or have apertures therein. The housing can be of other shapes preferably streamlined.

The spacer 24 can be wood, metal, plastic and the like.

The (weights or) weight 26 is desirably annular with axially aligned notches on its periphery and can be of metal, stone or other heavy material.

It is desirable that in such weight (or weights) the greater part of its mass be concentrated at the rear thereof and large enough transversely to cause it to contact the inside housing walls as stated above. By "contact" is meant to include engage, roll on and/or rub the inside housing (or resonator) walls.

Various fish hooks, various shaped housings and various ornamentations can be added to this embodiment of the fishing lure of the invention within the scope thereof.

An exemplary embodiment of the above described audible fishing lure has a rotary vane or spoon which rotates around a spindle causing the upper outside portion of the spindle to describe a cone, while inside a closed oblong housing, the second portion of the spindle describes an inverted cone in the opposite sense which brings the annular notched weight into contact with the inside surfaces of the housing on which it rolls. This type of audible fishing lure produces a regular and continuous emission of sound waves.

II. Spoon Type Audible Fishing Lure With Hook Attached To The Spindle

In another embodiment, an audible fishing lure has been developed which while related to the above described fishing lure embodying the invention has a further novelty that this latter lure can conduct two modes of operation: discontinuous emission of vibration and the ability to return to regular and continuous emission of discreet sound waves.

Broadly, this embodiment of the invention provides an artificial fishing lure comprising, an elongated spindle, a vane rotatably mounted thereon, a bell-like resonator axially mounted on the spindle, said resonator being open at the aft end thereof, a weight suspended from said spindle within said resonator with relatively close clearance between said weight and the walls of said resonator such that relative motion of said lure through the water imparts rotational movement to the vane and axially revolution to the resonator relative to said spindle and said weight such that the weight contacts the inside surfaces of the resonator emitting sound signals in the water.

In this embodiment, as described below, it will be seen that the housing or resonator is an elongated bell open at the bottom and the hook is connected directly to the spindle below (aft of) the weight.

An example of this audible fishing lure embodying in the present invention is shown in FIGS. 2, 3 and 4 of the drawings.

Referring in further detail to the drawings, spindle 32 has rotatably mounted thereon stirrup 34 which supports spoon 38 by passing through aperture 36 thereof, which stirrup 34 bears on bushings 40 and 42 against the forward or tapered portion of resonator 44 also mounted on the spindle, as shown in FIGS. 2,3, and 4.

The steel wire spindle 32 passes through the bell-like resonator 44 through another spacer bushing 46 through grooved annular weight 48, through another spacer bushing 50 (which is positioned within the annular weight 48) and the spindle wire 32 then passes through the eye of fish hooks 52 and doubles back on spindle segment 33 and terminates in a right angle bend 35 to form a bearing surface for the spacer 46 above the annular notched weight 48, as shown in FIGS. 2 and 3. The spacer bushing 46 supports the upper or forward portion of the bell resonator 44. As stated above, the passage of the artificial lure through the water causes the vane 38 and the stirrup 34 to rotate about the spindle (wire), the stirrup often bearing on the two bushings 40 and 42 (of unequal size) which in turn bear on the forward tapered portion of the resonator 44. The resonator accordingly undergoes axial revolution causing the skirt thereof to describe an annular path, eg. of circle centers 0-0', as shown in FIG. 3.

While the axis of the bell resonator is describing a cone of revolution in one direction, the spindle 32 can describe a cone of revolution of small diameter in the opposite direction or undergo little significant movement except in the axial direction the lure is being moved or towed. These relative movements cause the inner wall of the bell, which moves in the above described cone of revolution to come into audible contact, eg. rubbing, rolling and the like with the notched sinker weight. This contact is not strictly regular, which results in variations in frequency and loudness of emitted signals which are suitable for alerting the curiosity of fish in the vicinity. Further, an interesting pheonomenon occurs; twisting of the fishing line is avoided or reduced since the notched sinker weight is relatively rotated in a direction counter-to that of the rotating spoon. The resonator bell 44 (and spoon 38) and the notched weight 48 can rotate in either opposite directions or rotate in the same direction at different rotational speeds to produce relative motion and intermittent contact therebetween.

The assembled fishing lure from the "X" dashed line downwardly or aft of the spoon is illustrated in FIG. 4 to show the position of the respective components described above. Further, another embodiment of the invention is illustrated wherein the bell resonator 44 of FIG. 3 is replaced by an open work annular resonator 54, wherein the annular skirt 56 thereof is connected to the spindle wire by a single arm 58. In this example, the bell shaped resonator is reduced to an annular ring which surrounds the notched sinker weight in relatively close clearance.

Accordingly, the sound generating resonator can be a bell or open work structure, the shell of which can be continuous or discontinuous. The resonator can be statically balanced with more or less cyclic emission of sound waves resulting or unbalanced by a local addition or removeable of material to or from the resonator support to obtain continuous emission of sound waves. Accordingly, the type of sound waves emitted by the lure when in use passing through the water, can be regulated by selecting a bell-shaped resonator or a discontinuous annular ring resonator to result in the cyclic emission sound waves (discontinuous) or a continuous emission of sound waves.

According to the above embodiments of the invention shown in FIGS. 2, 3 and 4, the rotation of the spoon around the spindle wire causes movement of the bell so that its geometrical axis describes a cone which causes the weight 48 to roll around or otherwise contact the resonator walls to emit sound waves. Concurrently, the axis of the weight 48 can describe a cone of rotation in the opposite direction to that described by the resonator 44 (and opposite to the direction of rotation of the spoon 38), be axially relatively stationary or counterrotate relative to the movement of the resonator to avoid or reduce twisting of the fishing line which tows the lure.

The respective component parts of the fishing lure of the second embodiment, as illustrated in FIGS. 2, 3 and 4, are made of the same materials, described above, for the embodiment illustrated and described with respect to FIG. 1. The sinker weight 48 or any other sinker weight employed in the present invention is desirably notched in the vertical direction as illustrated in FIGS. 3 and 4. However, such weight can be notched in various curved or straight line directions to assist rotatability thereof in the desired direction and to assist the noise generating characteristics thereof within the scope of the present invention.

The fishing lures embodying the present invention are applicable to all lures which are moved in translation through the water for all forms of fishing. An interesting application of the present invention is to employ the lures embodied herein in cast fishing with a rod, known as sport fishing. Other applications include trolling with the lures embodying the invention through moving or relatively stationary water.

What is claimed is:

1. An artificial fishing lure comprising, an elongated spindle, a vane rotatably mounted thereon, a housing axially mounted on said spindle aft of said vane, the spindle passing with clearance into said housing, a weight mounted with clearance around said spindle within said housing such that relative motion of said lure through the water imparts rotational movement to the vane which causes relative rotation of said weight with respect to said housing such that said weight moves into contact, including rotational contact, with the inside walls of said housing.

2. The lure of claim 1 wherein a fish hook is attached to the aft portion of said housing.

3. The lure of claim 1 wherein the vane is a spoon attached to a stirrup, attached in turn to the spindle which spoon and stirrup rotate around the spindle.

4. The lure of claim 3 wherein the stirrup is separated from the housing by at least one bushing rotationally mounted on said spindle.

5. The lure of claim 1 wherein the rotation of said vane causes that portion of the spindle above the housing to describe a cone of revolution in one direction while that portion of the spindle within and aft of the housing describes an inverted cone of revolution in the opposite direction.

6. The lure of claim 1 wherein said spindle is a wire and the weight is annular having a notched periphery, the weight moving relative to the housing walls in a laterally annular path within said housing.

7. The lure of claim 6 wherein said housing is longitudinally oval with the smaller end being forward.

8. An artificial fishing lure comprising, an elongated spindle, a vane rotatably mounted thereon, an annular resonator axially mounted with clearance around said spindle aft of said vane, said resonator being open at the aft end thereof, a weight mounted with clearance around said spindle within said resonator with relatively close clearance therebetween, such that relative motion of said lure through the water imparts rotational movement to the vane and axial revolution to the resonator relative to said spindle and said weight, said resonator and said weight thereby having relative rotational movement with respect to each other such that said weight contacts, including rotational contact, the inside surfaces of said resonator, emitting sound signals in the water.

9. The lure of claim 8 wherein said spindle passes through said weight and attaches to a fish hook extending aft of said resonator.

10. The lure of claim 8 wherein the vane is a spoon attached to a stirrup, attached in turn to the spindle which spoon and stirrup rotate around the spindle.

11. The lure of claim 8 wherein at least one bushing each is mounted around said spindle between the stirrup and the resonator, between the inside forward portion of the resonator and the weight and between the weight and the spindle therein.

12. The lure of claim 8 wherein said spindle is a wire and the weight is annular having a notched periphery, the weight traveling in a lateral annular path within said resonator.

13. The lure of claim 8 wherein the rotation spindle is a steel wire substantially coincident with the translation axis of the lure.

14. The lure of claim 8 wherein said resonator comprises an annular ring which is supported by an arm connected to the spindle.

15. The lure of claim 14 wherein the resonator has a bell shape.

16. The lure of claim 8 wherein the resonator is of balanced weight construction such that the lure transmit variable sound waves.

17. The lure of claim 8 wherein the resonator is of unbalanced weight construction such that the lure emits sound waves continuously.

18. The lure of claim 8 wherein the axis of the resonator and the axis of the sinker weight revolve in opposite directions to resist and reduce twisting of the fishing line.

19. The lure of claim 8 wherein said resonator and said weight relatively rotate in opposite directions to resist and reduce twisting of the fishing line.

20. The lure of claim 1, wherein a tubular spacer is mounted around said spindle within said housing between the leading portion thereof and said weight.

21. The lure of claim 8 wherein said weight is annular with a bore therethrough appreciably larger than the cross-sectional area of said spindle passing therethrough.

22. The lure of claim 8 wherein said spindle is relatively rigid.

23. The lure of claim 9 wherein said fish hook has a plurality of hooks thereon.

24. The lure of claim 9 said fish hook has at least three hooks projecting radially from the axis thereof.

25. The lure of claim 22 wherein the rotation of said vane causes that portion of the spindle above the resonator to describe a cone of revolution in one direction while that portion of the spindle within and aft of the resonator described an inverted cone of revolution in the opposite direction.

26. The lure of claim 22 wherein said resonator revolves on said spindle such that the axis of said resonator describes a cone of revolution around the translational axis of said lure.

27. The lure of claim 26 wherein the leading portion of said resonator is proximate the smaller end of said cone of revolution.

* * * * *